US007611250B2

(12) United States Patent
Chern et al.

(10) Patent No.: US 7,611,250 B2
(45) Date of Patent: Nov. 3, 2009

(54) PROJECTOR

(75) Inventors: Jyh-Long Chern, Hsinchu (TW); Ran-Hong Chang, Taipei County (TW); Yi-Kai Cheng, Tainan County (TW); Ming-Der Chou, Taipei (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 574 days.

(21) Appl. No.: 11/163,681

(22) Filed: Oct. 27, 2005

(65) Prior Publication Data

US 2007/0097339 A1    May 3, 2007

(51) Int. Cl.
G03B 21/00    (2006.01)
G03B 21/14    (2006.01)

(52) U.S. Cl. ......................................... 353/122; 353/48
(58) Field of Classification Search .................. 353/48, 353/63, 64, 122; 359/634; 348/339
See application file for complete search history.

(56) References Cited

U.S. PATENT DOCUMENTS

| 5,061,041 | A | * | 10/1991 | Fergason | 349/7 |
| 5,673,986 | A | * | 10/1997 | Koo | 353/98 |
| 6,870,683 | B2 | * | 3/2005 | Park | 359/634 |
| 6,910,777 | B2 | * | 6/2005 | Ito | 353/31 |
| 2004/0233551 | A1 | | 11/2004 | Takahashi et al. | |

FOREIGN PATENT DOCUMENTS

| CN | 1427623 A | 7/2003 |
| JP | 62-032431 | 2/1987 |
| JP | 1-269910 | 10/1989 |
| JP | 03-146919 | 6/1991 |
| JP | 03-186831 | 8/1991 |
| JP | 05-088003 | 4/1993 |
| JP | 10-206881 | 8/1998 |
| JP | 2001-154608 | 6/2001 |
| JP | 2002-207168 | 7/2002 |
| JP | 2002523811 | 7/2002 |
| JP | U3090669 | 10/2002 |
| JP | 2004-126146 | 4/2004 |
| JP | 2005-252357 | 9/2005 |
| JP | 2007-528020 | 10/2007 |
| JP | 2004-514930 | 4/2008 |

\* cited by examiner

*Primary Examiner*—Hung Henry Nguyen
(74) *Attorney, Agent, or Firm*—Jianq Chyun IP Office

(57) ABSTRACT

A projector including a display screen and an imaging system is provided. The imaging system is adapted for providing an optical image and the optical image is transmitted to the display screen through an optical transmission medium. The refractive index of the optical transmission medium is not equal to one. The transmission path of the optical image is changed by controlling the refraction index of the optical transmission medium in order to thin the projector.

8 Claims, 6 Drawing Sheets

PROJECTOR

BACKGROUND OF THE INVENTION

1. Field of the Invention

The present invention generally relates to a projector. More particularly, the present invention relates to a projector and the volume of the projector is minimized by a medium to adjust the refraction path of the light.

2. Description of Related Art

The advancement of multi-media systems in our society depends to a large extent on the progressive development of semiconductor devices and display devices. For displays, because direct-viewing displays have definite dimensional limitations, the integration of a high-resolution indirect viewing display panel with an efficient optical engine has become the mainstream design for producing a large rear projector and rear projection television.

FIGS. 1 and 2 are schematic cross-sectional views showing two kinds of conventional rear projectors. Please refer to FIG. 1, the conventional rear projector 100 transmits an optical image 112 to a display screen 120 through an imaging system 110. The optical image 112 of the rear projector 200 shown in FIG. 2 is provided by the imaging system 110. Because the imaging system 110 and the display screen 120 are disposed at the same side, the optical image 112 is transmitted to the display screen 120 by the reflection of the reflection mirror 130.

Please refer to FIGS. 1 and 2, the conventional rear projector utilizes the air as a transmission medium of the optical image 112. In other words, nothing is disposed between the imaging system 110 and the display screen 120 shown in FIG. 1, or between the reflection mirror 130 and the display screen 120 shown in FIG. 2. Because the refraction index of the air is a constant, the transmission path and the angle of the optical image 112 remain the same without any changes. However, if the included angle between the optical image 112 and the display screen 120 is wrong or the transmission path needs to be changed, the conventional rear projector can't adjust appropriately. Also, the volume of the rear projector is constrained by the design of the optical path, and the rear projector can't be thinner.

SUMMARY OF THE INVENTION

Accordingly, the present invention is directed to a projector. The optical path of an optical image transmitted to a display screen can be adjusted in order to thin the projector.

The present invention provides a projector comprising a display screen and an imaging system. The imaging system is adapted for providing an optical image. The optical image is transmitted to the display screen through an optical transmission medium, in which the refraction index of the optical transmission medium is not equal to one.

The present invention also provides a projector comprising a display screen, a reflector, an imaging system and an optical transmission medium. The imaging system is adapted for providing an optical image. The reflector is disposed on a transmission path of the optical image and a refraction space is formed between the reflector and the display screen. The optical transmission medium is disposed in the refraction space. The optical image travels through the optical transmission medium by the reflection of the reflector and then is transmitted to the display screen, in which the refraction index of the optical transmission medium is not equal to one.

In a preferred embodiment, the above mentioned reflector is a reflection mirror or a Fresnel reflection mirror for example. In one embodiment, the Fresnel reflection mirror has a reflection curved surface. The reflection surface is a surface with a plurality of convex or concave spherical patterns.

In a preferred embodiment, the refraction space between the reflector and the display screen is filled with the optical transmission medium for example.

In a preferred embodiment, the refraction index of the optical transmission medium changes with the transmission direction of the optical image for example.

In a preferred embodiment, the optical transmission medium comprises liquid crystals, a solid material, a liquid material and a combination thereof for example. For instance, the solid optical transmission medium comprises $SiO_2$, a plastic material and a combination thereof. The plastic material comprises polycarbonate (PC), polymethyl methacrylate (PMMA) and a combination thereof for example. The liquid optical transmission medium comprises water or an organic solvent for example. Besides, in a preferred embodiment, the solid optical transmission medium is doped with a dopant for example. The solid optical transmission medium doped with the dopant is $SiO_2$ and the dopant is indium for example.

According to one embodiment of the present invention, the above mentioned solid material has a light emission curved surface. In a preferred embodiment, the curved surface is a surface with a plurality of convex or concave spherical patterns.

The projector of the present invention makes the optical image travel through the optical transmission medium before it is transmitted to the display screen, in which the refraction index of the optical transmission medium is not equal to one. Besides, the invention may change the reflection surface curvature of the reflector in order to control the incident angle, in which the optical image is incident to the optical transmission medium, so as to change the transmission path of the optical image. In other words, the transmission path of the optical image of the projector is changed by controlling the refraction index of the optical transmission medium and adjusting the reflection surface curvature of the reflector, to thin the projector.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
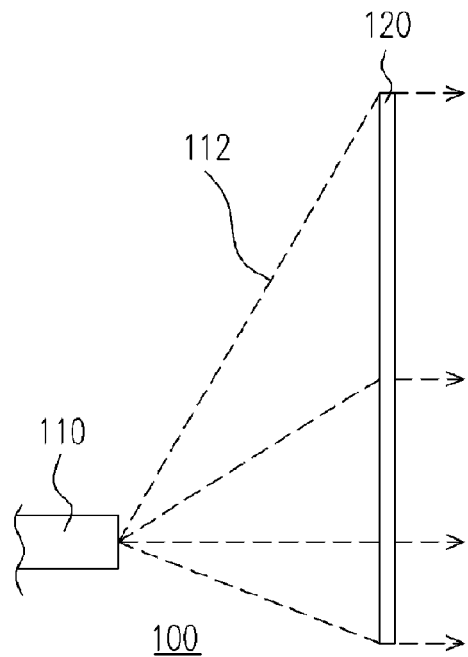
FIGS. 1 and 2 are schematic cross-sectional views showing two kinds of conventional rear projectors.
Figure 2:
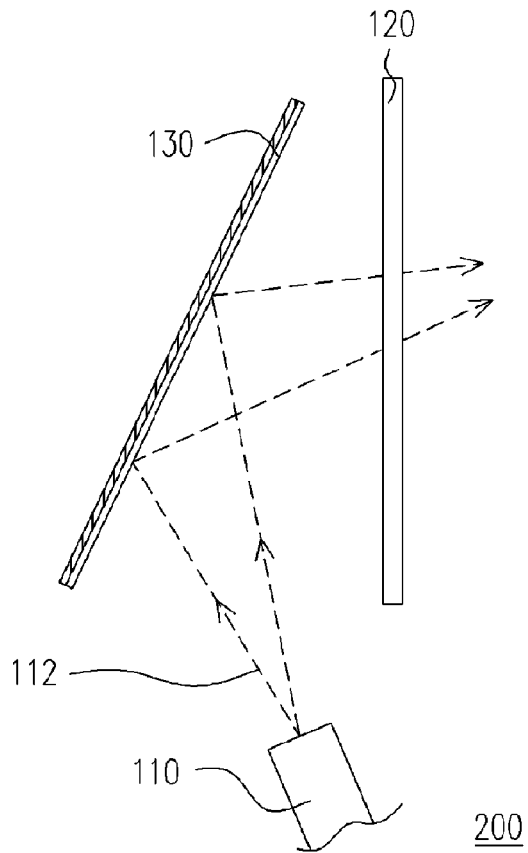

Reference will now be made in detail to the present preferred embodiments of the invention, examples of which are illustrated in the accompanying drawings. Wherever possible, the same reference numbers are used in the drawings and the description to refer to the same or like parts.

Figure 3:
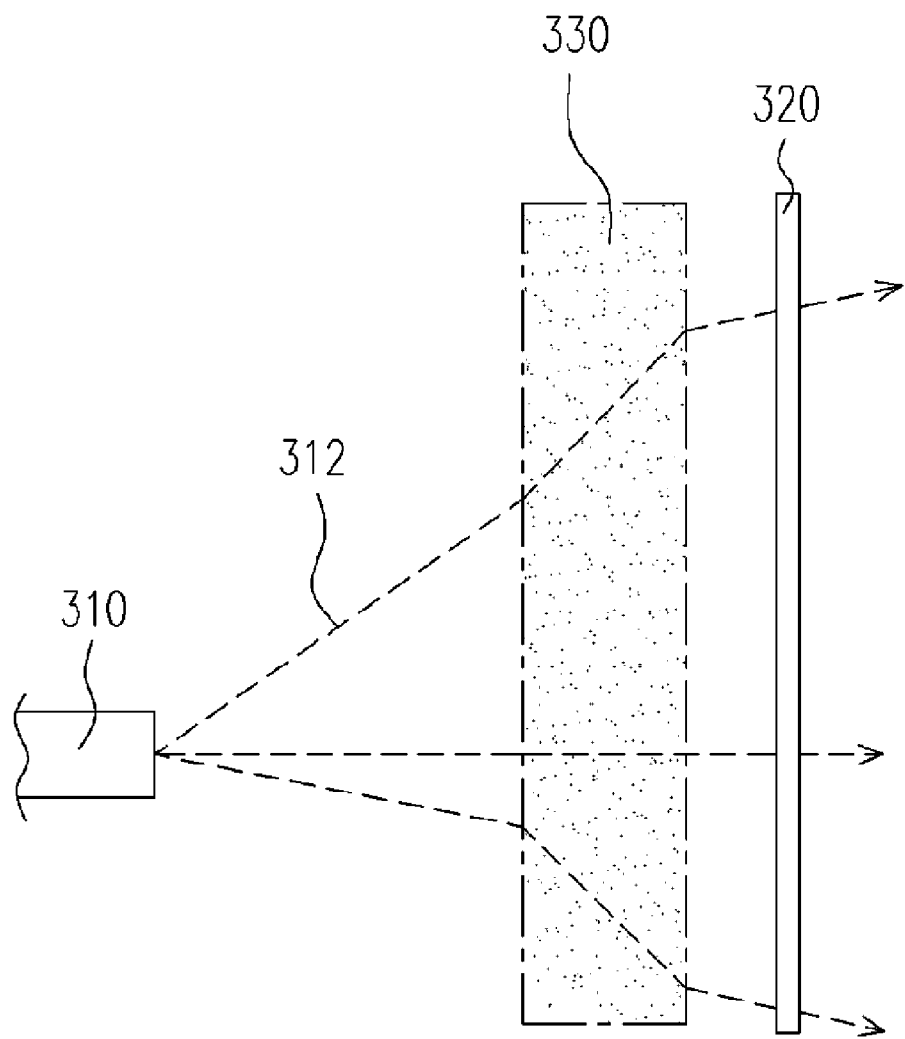
FIG. 3 is a schematic cross-sectional view showing a projector according to the first embodiment of the present invention.

FIG. 3 is a schematic cross-sectional view showing a projector according to the first embodiment of the present invention. Please refer to FIG. 3, the projector 300 comprises a display screen 320 and an imaging system 310. The imaging system 310 is adapted for providing an optical image 312 and the optical image 312 is transmitted to the display screen 320 through an optical transmission medium 330, in which the refraction index of the optical transmission medium 330 is not equal to one. The optical transmission medium 330 may be a solid material, a liquid material, liquid crystals, etc.

It should be noted that in a preferred embodiment, the refraction index of the optical transmission medium 330 changes with the transmission path of the optical image 312 for example, and the optical transmission medium 330 is composed of at least two materials for example. In other words, the optical transmission medium 330 can be a solid material, a liquid material, liquid crystals or any combinations of these materials.

For the solid optical transmission medium 330, it can be made of the main material of general lenses such as $SiO_2$. It should be noted that if the $SiO_2$ is doped with a dopant, the refraction index of the $SiO_2$ is changed according to the doping concentration of the dopant. So, the optical transmission medium 330, whose refraction index changes with the transmission direction of the optical image 312, can be made by controlling the doping concentration of the dopant doped in the $SiO_2$, to answer the requirement. In one embodiment, the $SiO_2$ is doped with indium or other transparent metal for example.

Besides, the solid optical transmission medium 330 is made of a plastic material such as polycarbonate (PC), polymethyl methacrylate (PMMA) or a combination thereof. In addition, the liquid optical transmission medium 330 is water or an organic solvent for example. Of course the liquid optical transmission medium 330 can be made of at least two liquid materials. The composition of the liquid materials is not limited in the present invention. Any liquid materials which are not corrosive and have an appropriate light transmittance can serve as the optical transmission medium 330.

Please continue to refer to FIG. 3, in light of the above, after the optical image 312 passes through the optical transmission medium 330, the transmission path of the optical image 312 transmitted to the display screen 320 is determined by the refraction index of the optical transmission medium 330. In other words, the transmission path of the optical image 312 can be adjusted by changing the refraction index of the optical transmission medium 330. For the above mentioned solid or liquid optical transmission medium 330, with the changes of temperature and pressure of the optical transmission medium 330, the refraction index of the optical transmission medium 330 would be changed. Besides, if the liquid crystals serve as the optical transmission medium 330 of the projector 300, the electrical field applied to the optical transmission medium 330 is changed in order to change the refraction index of the optical transmission medium 330.

Figure 4:
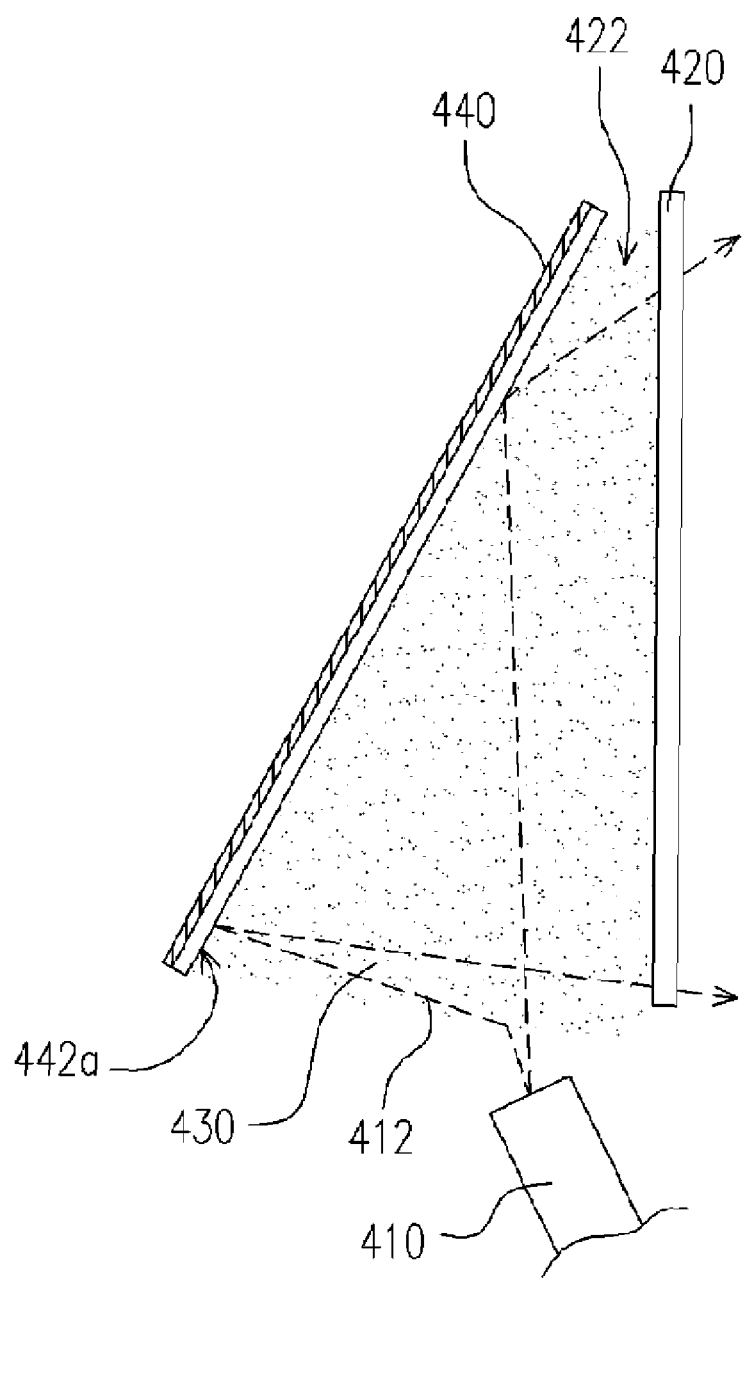
FIG. 4 is a schematic cross-sectional view showing a projector according to the second embodiment of the present invention.

FIG. 4 is a schematic cross-sectional view showing a projector according to the second embodiment of the present invention. Please refer to FIG. 4, the projector 400 comprises an imaging system 410, a display screen 420, an optical transmission medium 430 and a reflector 440. The imaging system 410 is adapted for providing an optical image 412 and is disposed at the same side as the display screen 420. So, the optical image 412 is reflected by the reflector 440 in advance and then it is transmitted to the display screen 420. A refraction space 422 is formed between the reflector 440 and the display screen 420, and the optical transmission medium 430 is disposed in the refraction space 422. Accordingly, after the optical image 412 is reflected by the reflector 440, it travels through the optical transmission medium 430 in advance and then is transmitted to the display screen 420. The refraction index of the optical transmission medium 430 is not equal to one.

It should be noted that the optical transmission medium 430 is filled with the whole or a portion of refraction space 422. The distribution of the optical transmission medium 430 is not limited in the present invention.

Figure 5:
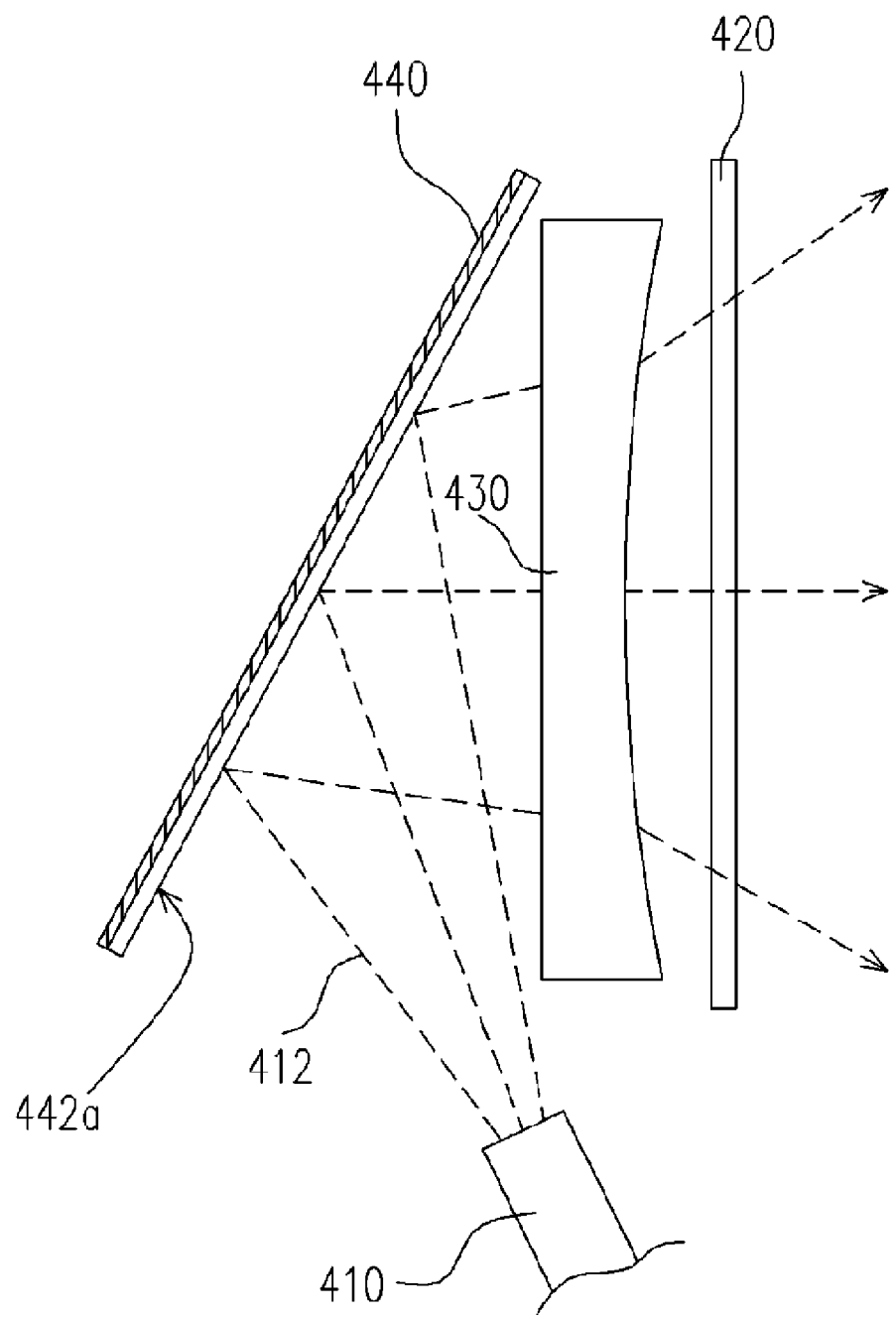
FIGS. 5 to 7 are schematic cross-sectional views showing a projector according to other embodiments of the present invention.
Figure 6:
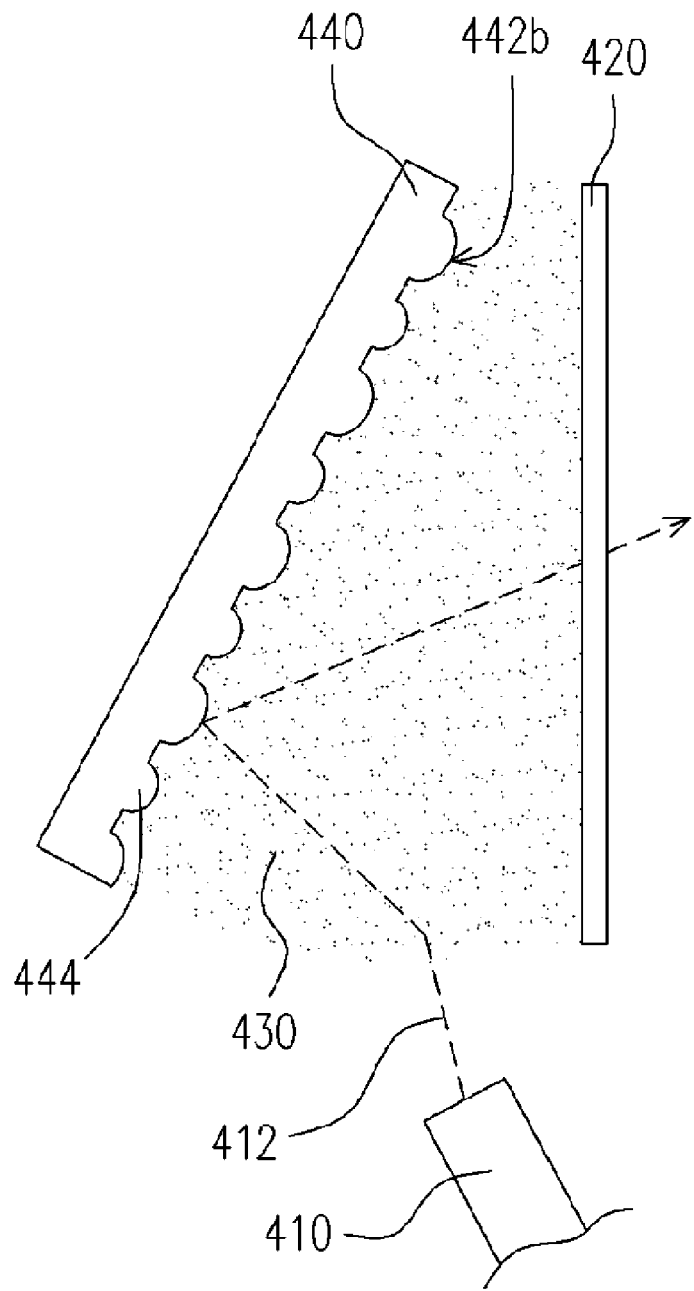
Figure 7:
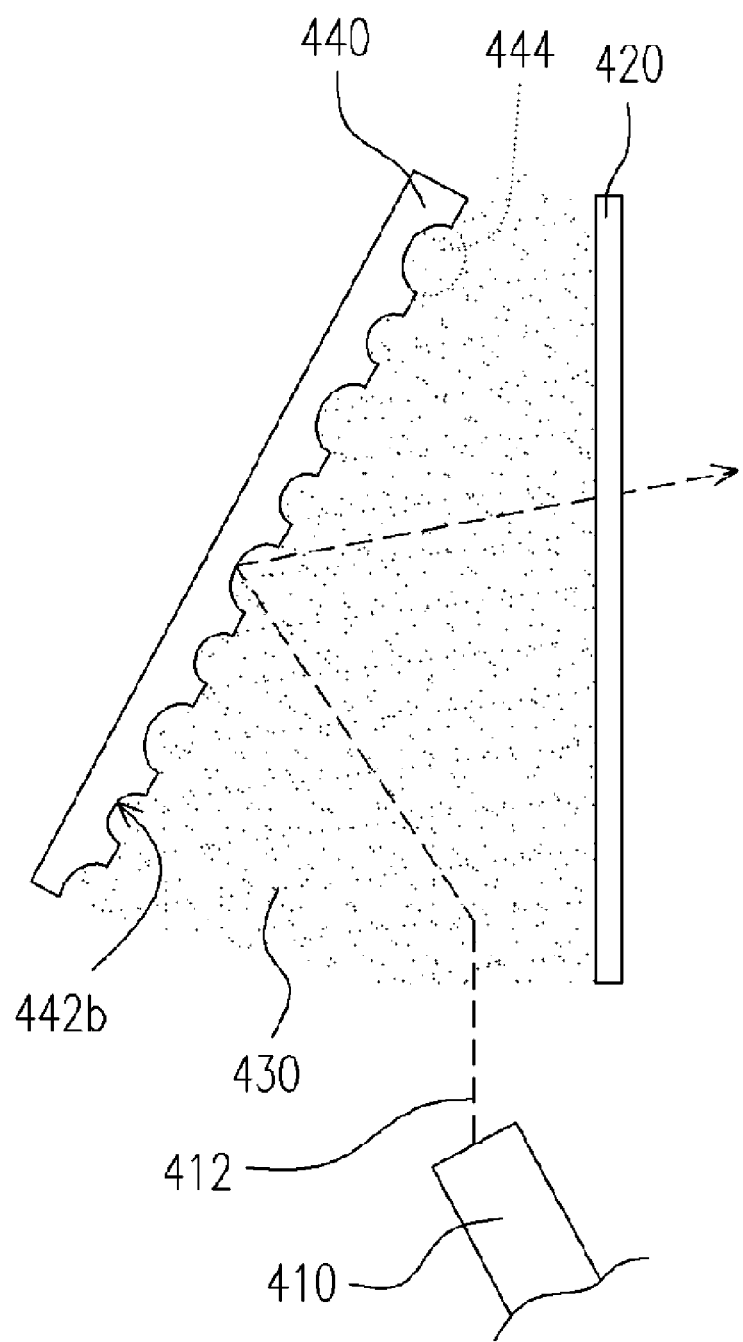

In light of the above, the optical transmission medium 430 can be not only the materials as described in the first embodiment but also the solid materials having a light emission curved surface 432. FIG. 5 is a schematic cross-sectional view showing a projector according to another preferred embodiment of the present invention. Please refer to FIG. 5, the solid optical transmission medium 430 has a light emission curved surface 432 for example, so as to make the optical transmission medium 430 has the similar effects as the Fresnel lens. The light emission surface curved is a surface with a plurality of convex spherical patterns 434 for example. Of course, in another embodiment, the light emission curved surface 432 can also be a surface with a plurality of concave spherical patterns 435 for example as shown in FIG. 6. Besides, the light emission curved surface 432 of the optical transmission medium 430 can also have an aspheric-type pattern (not shown) to further improve the quality of the optical image 412 and make the optical image 412 fit the light incident conditions The reflector 440 can be a reflection mirror with a smooth reflection surface 442a as shown in FIG. 4 and it can also be a Fresnel reflection mirror with a reflection curved surface 442b as shown in FIGS. 6 and 7. Please refer to FIGS. 6 and 7, the reflection surface 442b is a surface with a plurality of concave or convex spherical patterns 444 as mentioned before. The reflection path after the optical image 412 is transmitted to the reflection surface 442b is related to the curvature of the spherical patterns 444. It means that the incident angle, in which the optical image 412 is incident to the optical transmission medium 430, can be adjusted by the changes of the curvature of the spherical patterns 444, so as to change the transmission path of the optical image 412 from the imaging system 412 to the display screen 420.

The main spirit of the present invention is that the transmission path of the optical image is changed with the optical transmission medium. So, the present invention can apply to any rear projectors and are not limited to the projectors shown in the above embodiments.

In summary, the projector of the present invention is to make the optical image travel through an optical transmission medium, whose refraction index is not equal to one, before it is transmitted to the display screen. So, the refraction index of the optical transmission medium is changed by choosing an appropriate optical transmission medium according to the actual requirement or using some special methods (with the changes of the temperature, pressure, electrical field, etc. of the optical transmission medium), to shorten the transmission path of the optical image, so as to thin the projector.

In addition, the incident angle, in which the optical image is incident to the optical transmission medium, is controlled by the changes of the reflection surface curvature of the reflector in the projector, to further change the transmission path of the optical image. In other words, the transmission path of the optical image is changed by adjusting the refraction index of the optical transmission medium and the reflection surface curvature of the reflector so as to thin the projector and answer the current trend.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A projector, comprising:
   a display screen;
   an imaging system adapted to provide an optical image and
   an optical transmission medium, the display screen and the imaging system respectively located at opposite sides of the optical transmission medium, the optical image transmitted to the display screen through the optical transmission medium, wherein a refractive index of the optical transmission medium is not equal to one and not fixed, and a transmission path of the optical image transmitted to the display screen is determined by the refraction index of the optical transmission medium such that the transmission path of the optical image is bended by less than 90°.

2. The projector according to claim 1, wherein the optical transmission medium comprises liquid crystals, a solid material, a liquid material and a combination thereof.

3. The projector according to claim 2, wherein the solid material comprises SiO2, a plastic material and a combination thereof.

4. The projector according to claim 2, wherein the solid material comprises a dopant.

5. The projector according to claim 4, wherein the solid material is SiO2.

6. The projector according to claim 5, wherein the dopant is indium.

7. The projector according to claim 3, wherein the plastic material comprises polycarbonate, polymethyl methacrylate and a combination thereof.

8. The projector according to claim 2, wherein the liquid material comprises water, an organic solvent and a combination thereof.

* * * * *